United States Patent
Becher et al.

(10) Patent No.: US 6,764,569 B1
(45) Date of Patent: Jul. 20, 2004

(54) ADHESIVE SYSTEM FOR FORM REVERSIBLE GLUED JOINTS

(75) Inventors: Peter Becher, Grafenau (DE); Heinrich Flegel, Aidlingen (DE); Michael Herrmann, Neuhausen (DE); Peter Kurzmann, Gärtringen (DE); Jörg Bauer, Senzig (DE); Monika Bauer, Senzig (DE); Hartmut Krüger, Berlin (DE); Jens Neumann-Rodekrich, Berlin (DE); Jürgen Schneider, Teltow (DE); Michael Hirthhammer, Gailberg (DE)

(73) Assignees: DaimlerChrysler AG, Stuttgart (DE); Fraunhofer-Gesellschaft zur Forderung der Angewandten Forschung E.V., Munich (DE); Henkel KgaA, Dusseldorf-Holthausen (DE)

( * ) Notice: Subject to any disclaimer, the term of this patent is extended or adjusted under 35 U.S.C. 154(b) by 0 days.

(21) Appl. No.: 09/744,149

(22) PCT Filed: Jul. 3, 1999

(86) PCT No.: PCT/EP99/04640
§ 371 (c)(1),
(2), (4) Date: Mar. 29, 2002

(87) PCT Pub. No.: WO00/05288
PCT Pub. Date: Feb. 3, 2000

(30) Foreign Application Priority Data

Jul. 21, 1998 (DE) ......................... 198 32 629

(51) Int. Cl.$^7$ ................. C08G 18/32; C08G 18/83; C09J 175/00
(52) U.S. Cl. ................. 156/272.2; 156/330; 156/331.7; 156/344; 522/1
(58) Field of Search ............................. 522/1; 156/344, 156/330, 331.7, 272.2, 584

(56) References Cited

U.S. PATENT DOCUMENTS

| | | | | |
|---|---|---|---|---|
| 3,871,911 A | * | 3/1975 | Conacher | 428/423.3 |
| 3,938,266 A | * | 2/1976 | Cook | 156/344 |
| 4,125,522 A | * | 11/1978 | Becker | 156/331.4 |
| 4,599,273 A | * | 7/1986 | Eian et al. | 428/412 |
| 4,882,399 A | * | 11/1989 | Tesoro et al. | 525/523 |
| 4,938,900 A | * | 7/1990 | Moriwaki et al. | 264/4.1 |
| 5,525,422 A | * | 6/1996 | Spies et al. | 428/355 AC |
| 5,560,934 A | * | 10/1996 | Afzali-Ardakani et al. | 424/497 |
| 5,840,614 A | * | 11/1998 | Sim et al. | 438/464 |
| 5,976,955 A | * | 11/1999 | Hodges | 438/464 |
| 6,140,151 A | * | 10/2000 | Akram | 438/113 |
| 6,329,473 B1 | * | 12/2001 | Marten et al. | 525/438 |

FOREIGN PATENT DOCUMENTS

DE 9216278 U1 * 2/1993

OTHER PUBLICATIONS http://www.furakawa.co.jp/uvtape/en/siyou.htm*

* cited by examiner

Primary Examiner—Jeff H. Aftergut
Assistant Examiner—John T. Haran
(74) Attorney, Agent, or Firm—Crowell & Moring LLP

(57) ABSTRACT

An adhesive system for forming reversible adhesive bonds includes at least one polymeric adhesive component comprising at least one of polyurethanes, polyureas, or epoxy resins and at least one additional component that includes a functional group that can be activated by the introduction of energy, such that a chemical reaction with the adhesive component takes place involving a partial breakdown of the adhesive component. Reversible bonding of articles and controlled parting of an adhesive bond between articles can be achieved with the adhesive system.

27 Claims, No Drawings

ADHESIVE SYSTEM FOR FORM REVERSIBLE GLUED JOINTS

BACKGROUND AND SUMMARY OF THE INVENTION

The present invention relates to an adhesive system for forming reversible adhesive bonds, comprising at least one polymeric adhesive component based on polyurethanes and/or polyureas and/or epoxy resins and at least one additional component. The present invention further relates to a process for the reversible bonding of articles and controlled parting of the adhesive bond obtained.

In a very wide variety of technical fields, articles are nowadays bonded to one another. In particular welded connections which have been customary to date are being replaced by adhesive bonds. High-strength adhesive bonds with resistance properties are required for this purpose. This is especially the case in connection with the production of motor vehicles. A disadvantage with this method of construction is that, for a refinish or for recycling, the individual bonded components of the motor vehicles are difficult to separate, their separation being time-consuming and requiring force: for example, by means of a hammer and chisel, or by sawing or flame cutting.

Adhesive systems of this generic type are known, for example, from U.S. Pat. No. 4,599,273. This document relates to surface-active substances whose surface-active effect is blocked by additional components in the form of photolabile protective groups. By exposure to radiation, the protective groups are removed and the surface-active effect is re-established. Surface-active substances of this kind may also comprise coatings which may be applied reversibly. However, they cannot be used to realize high-strength adhesive bonds.

DE 92 16 278 U1 discloses pressure-sensitive adhesives with which components of motor vehicles can be reversibly bonded to one another. These adhesives too cannot be used to realize high-strength adhesive bonds.

It is therefore the object of the present invention to provide adhesive systems of the type specified above with which high-strength adhesive bonds can be produced and which in a simple manner permit controlled mechanical separation of the articles bonded to one another.

This object is achieved by the at least one additional component comprising at least one functional group which can be activated by introduction of energy, in such a way that a chemical reaction with the adhesive component takes place, involving at least partial breakdown of the adhesive component.

The process of the invention is distinguished by the following steps:
preparation of an adhesive bond using an adhesive system of the invention,
deactivation of the adhesive bond by introduction of energy,
separation of the articles from one another.

DETAILED DESCRIPTION OF THE INVENTION

The adhesive system of the invention and, respectively, the process of the invention therefore make it possible to produce high-strength adhesive bonds by means of high-performance adhesives which are known in principle and are based on polyurethanes, polyureas and/or epoxy resins, which can be weakened in a controlled manner by supplying energy and so can be parted again. This is accompanied by a severe alteration in the molecular mass and/or the crosslinking density of the adhesive base polymer, i.e. the adhesive component. This leads to a loss of the mechanical strength of the adhesive. Accordingly, the articles bonded to one another can easily and simply be separated mechanically from one another at any time. This signifies a considerable saving in terms of time and cost.

Advantageous developments are evident from the subclaims. The additional component may simply be admixed to the adhesive system of the invention in the manner of an additive.

The additional component may be activatable by introduction of thermal energy, e.g. thermal conduction, convection or IR radiation, or by introduction of radiative energy of appropriate wavelength, especially microwaves.

It is also possible to use additional components which react spontaneously with the adhesive component without further activation. In this case, the additional components should be blocked, i.e. reduced in their reactivity. This can be done by attaching protective groups, by encapsulation or microencapsulation, or by complexing with an inorganic complexing agent. Deblocking is then preferably likewise activatable by introduction of thermal energy, e.g. thermal conduction or convection, and/or by introduction of radiative energy, especially microwaves or IR radiation.

Examples of suitable additional components are organic amines or organic acids. Organic bases result in base-catalysed cleavage of the epoxide backbone or of the urethane or urea bonds in the polymer backbone of the corresponding polymers. The epoxide backbone may also be cleaved using organic acids.

The organic amines and acids are blocked in their reactivity by providing them with protective groups or enclosing them in capsules or microcapsules, especially made of amino resin. Amines may also be complexed in a metal halide complex, preferably with lithium bromide or sodium chloride. These methods of deactivation are known in principle, for example from synthetic organic chemistry or in the case of depot active substances.

A further preferred embodiment of the present invention is that in which the adhesive component is chemically modified. The chemical modification consists in chemically attaching one or more structural components to the adhesive component, preferably by copolymerization. The structural components are chosen so that they react with the additional component, so that they are broken down. By this means, the adhesive component as well is weakened or completely destroyed.

Preferred structural components are triazine derivatives. Where triazines are incorporated by copolymerization into the adhesive component, cyanurate radicals are formed in the polymer backbone. On reaction with an amine, the triazine ring brings about the decomposition of the cyanurate radicals via an aminolysis. Accordingly, the adhesive component breaks down as well.

The adhesive systems of the invention may be used to bond articles of metal, plastics, glass or textiles, in each case individually or with one another. They are particularly suitable for producing production line adhesives which are employed in particular in car making.

The present invention is illustrated below with reference to exemplary embodiments.

I. EXAMPLE 1 (COMPARATIVE EXAMPLE)

S2 test rods (DIN 53455) measuring 140 cm' 10 cm' 3 cm were produced. They were cast from a moisture-curing PU adhesive based on diphenylmethane diisocyanate and polyetherpolyol and were cured for 10 days. The tensile strength was tested at 23° C. and 50% relative humidity. The tensile strength was 8 MPa.

II. EXAMPLE 2

The procedure described under I. was repeated, with the addition of 3% by mass of a lithium bromide/triaminoethylamine complex to the polyurethane adhesive prior to casting. The tensile strength of the test rods manufactured in this way was 8 MPa.

III. EXAMPLE 3

The procedure described under I. was repeated, with the addition of 4% by mass of amino resin-encapsulated octylamine to the polyurethane adhesive prior to casting. The tensile strength of the test rods manufactured in this way was 7 MPa.

IV. EXAMPLE 4

The procedure described under I. was repeated, with the addition of 3% by mass of a sodium chloride/4,4'-diaminodiphenylmethane complex to the polyurethane adhesive prior to casting. The tensile strength of the test rods manufactured in this way was 7 MPa.

V. Deactivation of the Adhesive Bond

The test rods manufactured in accordance with Examples 1, 3 and 4 were heated at 175° C. for 30 minutes. Their tensile strengths thereafter were as follows:

| | |
|---|---|
| Example 1 (comparative example): | 0.52 MPa |
| Example 3: | 1.02 MPa |
| Example 4: | 0.42 MPa |

VI. EXAMPLE 5 (COMPARATIVE EXAMPLE)

The procedure described under I. was repeated, using a prepolymer in which 22% by mass of the polyetherpolyol was replaced by a 2,4,6-tris(w-hydroxypolyalkoxy)-1,3,5-triazine reacted with diphenylmethane diisocyanate. The tensile strength of the straight cured polymer (not formulated as an adhesive) was 1.1 MPa.

VII. EXAMPLE 6

The procedure described under VI. was repeated, with the addition of 4% by mass of a sodium chloride/4,4'-diaminodiphenylmethane complex to the polyurethane adhesive prior to casting. The tensile strength of the test rods manufactured in this way was 1.2 MPa.

VIII. Deactivation of the Adhesive Bond

The test rods manufactured in accordance with Examples 5 and 6 were heated at 175° C. for 30 minutes. Their tensile strengths thereafter were as follows:

| | |
|---|---|
| Example 5 (comparative example): | 1.2 MPa |
| Example 6: | 0.2 MPa |

IX. EXAMPLE 7

2 g of tris(4-aminophenoxy)-1,3,5-triazine in solution in 10 g of aniline were mixed homogeneously at 90° C. with 44 g of bisphenol A diglycidyl ether and, for the production of test strips, the mixture was cast in moulds as described under I. Curing took place at 90° C. for 18 hours. By means of dynamic mechanical analysis, the glass transition temperature of the resulting material was found to be Tg=99° C. On heating to 120° C., a tacky mass without mechanical strength was formed.

X. EXAMPLE 8

13.5 g of the reaction product of 150 g of bisphenol A diglycidyl ether with 15 g of tris(4-aminophenoxy)-1,3,5-triazine were placed in moulds, as in IX., with 2.7 g of trimethyl-1,6-diaminohexane and with the addition of 3 g of N-tert-butyloxycarbonylaminooctane and the mixture was cured at 40° C. for 20 hours. Dynamic mechanical analysis gave a glass transition temperature of Tg=80° C. After heating at a temperature of 200° C. for at least 30 minutes, there was a rapid increase in the glass transition temperature. The material underwent embrittlement to such an extent that it broke even under the low stresses in the DMA instrument.

What is claimed is:

1. An adhesive system for forming reversible adhesive bonds, comprising:
    a polymeric adhesive component comprising at least one of polyurethanes, polyureas, or epoxy resins; and
    an additional component comprising at least one functional group that can be activated by introduction of energy, such that a chemical reaction with the adhesive component takes place resulting in at least partial breakdown of the adhesive component.

2. An adhesive system according to claim 1, wherein the additional component is admixed with the adhesive component.

3. An adhesive system according to claim 1, wherein the additional component is activatable by thermal energy or by radiative energy.

4. An adhesive system according to claim 1, wherein the additional component further comprises at least one protective group that blocks reactivity of the additional component.

5. An adhesive system according to claim 1, wherein the additional component is enclosed in a capsule or microcapsule that blocks the reactivity of the additional component.

6. An adhesive system according to claim 1, wherein the additional component is complexed with an inorganic complexing agents that blocks the reactivity of the additional component.

7. An adhesive system according to claim 4, wherein blocking of the additional component by the protective group can be eliminated by at least one of thermal energy or radiative energy.

8. An adhesive system according to claim 5, wherein blocking of the additional component by the capsule or microcapsule can be eliminated by at least one of thermal energy or radiative energy.

9. An adhesive system according to claim 1, wherein the additional component comprises one or more organic amines.

10. An adhesive system according to claim 1, wherein the adhesive component is an epoxy resin and the additional component comprises one or more organic acids.

11. An adhesive system according to claim 9, wherein the one or more organic amines are enclosed in capsules or microcapsules.

12. An adhesive system according to claim 11, wherein the capsules or microcapsules comprise amino resin.

13. An adhesive system according to claim 10, wherein the one or more organic acids are enclosed in capsules or microcapsules.

14. An adhesive system according to claim 13, wherein the capsules or microcapsules comprise amino resin.

15. An adhesive system according to claim 9, wherein the one or more organic amines is incorporated in a metal halide complex.

16. An adhesive system according to claim 15, wherein the metal halide complex comprises lithium bromide or sodium chloride.

17. An adhesive system according to claim 9, wherein the adhesive component further comprises at least one chemically attached structural component, wherein the structural component is selected so that upon activation of the additional component, a chemical reaction occurs with the structural component resulting in at least partial breakdown of the adhesive component.

18. An adhesive system according to claim 17, wherein the at least one structural component is incorporated by copolymerization into the adhesive component.

19. An adhesive system according to claim 17, wherein the at least one structural component is a triazine derivative.

20. A process for the reversible bonding of articles and controlled parting of the adhesive bonds between these articles, said process comprising:

preparing an adhesive bond between articles with an adhesive system according to claim 1;

deactivating the adhesive bond by introducing energy; and separating the articles from one another.

21. A process according to claim 20, wherein the introducing of energy comprises supplying heat.

22. A process according to claim 21, wherein the supplying of heat is by thermal conduction or convection.

23. A process according to claim 21, wherein the supplying of heat is by electromagnetic radiation.

24. A process according to claim 23, wherein the electromagnetic radiation comprises infrared radiation or microwaves.

25. A process according to claim 20, wherein the articles comprise a material selected from the group consisting metal, plastics, glass, textiles, and combinations of these materials.

26. A process according to claim 20, wherein the articles are components of a motor vehicle.

27. A production line adhesive comprising an adhesive system according to claim 1.

* * * * *